United States Patent [19]
Ueno

[11] Patent Number: 6,147,417
[45] Date of Patent: Nov. 14, 2000

[54] ACTUATOR OF PASSENGER PROTECTING SYSTEM

[75] Inventor: Yukiyasu Ueno, Nishio, Japan

[73] Assignee: Denso Corporation, Kariya, Japan

[21] Appl. No.: 09/228,419

[22] Filed: Jan. 12, 1999

[30] Foreign Application Priority Data

Feb. 10, 1998 [JP] Japan .................................. 10-028728
Mar. 2, 1998 [JP] Japan .................................. 10-049709

[51] Int. Cl.[7] ................................................ B60R 21/16
[52] U.S. Cl. ..................... 307/10.1; 280/728.1; 340/436; 701/45
[58] Field of Search .............................. 307/10.1; 701/45; 340/436; 280/728.1, 734, 735; 180/271

[56] References Cited

U.S. PATENT DOCUMENTS

| | | | |
|---|---|---|---|
| 4,497,025 | 1/1985 | Hannoyer | .................................. 701/45 |
| 5,657,831 | 8/1997 | Furui . | |
| 5,801,619 | 9/1998 | Liu et al. | .................................. 340/436 |
| 5,897,599 | 4/1999 | Takeuchi | .................................. 307/10.1 |
| 5,964,816 | 10/1999 | Kincaid | .................................. 701/45 |
| 6,012,980 | 2/2000 | Kimura et al. | .......................... 73/12.04 |

FOREIGN PATENT DOCUMENTS 9-2169 1/1997 Japan .
10-100856 4/1998 Japan .

*Primary Examiner*—Albert W. Paladini
*Attorney, Agent, or Firm*—Pillsbury Madison & Sutro LLP

[57] ABSTRACT

An actuator for inflating a vehicle air bag includes an acceleration sensor, a computer for judging a vehicle collision according to a signal of the acceleration sensor, a plurality of squibs for inflating the air bag, an electronic switch unit connected in series to a power source and the squibs, a drive circuit for driving the electronic switch unit to connect the power source and the squibs when the computer judges a vehicle collision. The drive circuit has a serial signal generator, a serial-parallel converter and a forbidding circuit. The serial signal generator generates a serial signal composed of a prescribed number of serial bit signals in a prescribed order, and the serial-parallel converter the serial signal to the prescribed number of parallel bit signals. The forbidding circuit forbids the electronic switch unit connecting the power source and the squibs except the parallel bit signals coincide with the prescribed order of the serial signal.

25 Claims, 9 Drawing Sheets

ACTUATOR OF PASSENGER PROTECTING SYSTEM

CROSS REFERENCE TO RELATED APPLICATION

The present application is based on and claims priority from Japanese Patent Applications Hei 10-28728 filed on Feb. 10, 1998 and Hei 10-49709 filed on Mar. 2, 1998, the contents of which are incorporated herein by reference.

BACKGROUND OF THE INVENTION

1. Field of the Invention

The present invention relates to an actuator of a passenger protecting system for a vehicle.

2. Description of the Related Art

In a conventional vehicle passenger protecting system, an air bag is inflated at a certain time after a belt pre-tensioner is actuated or the air bag is inflated by first and second squibs through two consecutive steps. For example, the second squib of the air bag is actuated to inflate the air bag completely about 50 milli-seconds after the first squib of the air bag is actuated to inflate the air bag initially. If a mechanical switch is used for actuating the first squib, it is difficult to assure the 50 milli-second period.

U.S. Pat. No. 5,657,831 (or JP-A-9-20205) proposes an actuator composed of a microcomputer, three electronic switches, two acceleration sensors and an integration circuit for the above purpose. In the actuator, when a microcomputer judges a collision of a vehicle based on a signal from a first acceleration sensor, the microcomputer turns on a first electronic switch. When a second acceleration switch is turned on, the integration circuit starts to integrate the signal voltage from the second acceleration sensor, and provides a signal to close the second electronic switch if the integrated signal voltage achieves a prescribed level.

However, it is not possible to diagnose a malfunction of the second electronic switch because the integration circuit is separated from the microcomputer. In addition, because all three switches are electronic switches, electrical noise, as well as moisture, may compromise the operation of the actuator.

JP-A-9-2196 proposes another actuator in which a switch is closed by a signal from a mechanical acceleration sensor. This actuator has substantially the same problem as the above.

SUMMARY OF THE INVENTION

A main object of the invention is to provide an improved actuator of a passenger protecting apparatus of a vehicle that is free from malfunction caused by noises or other disturbances.

According to one aspect of the invention, an actuator for a vehicle air bag includes an acceleration sensor; a computer for determining a vehicle collision according to an acceleration signal, a squib unit for actuating the air bag when energized, an electronic switch unit connected in series to a power source and the squib unit, a drive circuit for driving the electronic switch unit to connect the power source and the squib unit when the computer determines a vehicle collision; and a serial signal generator for generating a serial signal composed of a prescribed number of serial bit signals in a prescribed order. The drive circuit has a converter for converting the serial signal to the prescribed number of parallel bit signals and a prevention circuit for prevention the electronic switch unit from connecting the power source and the squib unit when the parallel bit signals do not coincide with a prescribed signal pattern corresponding to the prescribed order.

Preferably, the prevention circuit includes a plurality of circuits connected between the serial parallel converter and the electronic switch unit, and each of the plurality of circuits prevents the turning-on of the electronic switch when a signal applied thereto coincide with corresponding one of the parallel bit signals in the prescribed order.

Another object of the invention is to provide an actuator that can detect malfunction of circuit members connected to the electronic switch unit.

For this object, the actuator includes a diagnosis circuit for determining abnormalities according to a voltage across the electronic switch unit and a warning device operable when abnormality is judged.

Another object of the invention is to provide an actuator of a passenger protecting apparatus of a vehicle that holds a passenger harmless even if some of the electronic switching elements do not operate properly.

Preferably, the squib unit includes a first squib and a second squib, the electronic switch unit includes a first series circuit and a second series circuit. The first circuit has a pair of first and second electronic switches and the first squib connected in series, and the second circuit has a pair of third electronic and mechanical switches and the squib connected in series. When a shock at a prescribed level is applied to the vehicle, the mechanical switch closes. The computer also determines whether to actuate the second and first squibs stepwise or concurrently, according to the acceleration signal. The drive circuit includes a first drive circuit for turning on the first electronic switch, a second drive circuit for turning on the second electronic switch, and a third drive circuit for turning on the third electronic switch, respectively, according to the determinations of the computer. Thus, the third electronic switch is turned on to inflate the air bag at least partially.

The actuator preferably includes a one-way conductor element for connecting the first squib and the mechanical switch in series to actuate the first squib when the mechanical switch is closed, irrespective of the serial signal, thereby shortening the inflation time of the air bag.

Another object is to provide a method of operating a vehicle air bag. According to an aspect of the invention, a method of operating a vehicle air bag is composed of the following steps: providing a serial signal composed of a prescribed number of serial bit signals in a prescribed order; converting the serial signal to the prescribed number of parallel bit signals after the serial signal generator provide the serial signal; mechanically closing an electric switch to actuate the air bag partially when detecting a shock higher than a prescribed level given to the vehicle; providing an acceleration signal according to an acceleration of the vehicle; judging a vehicle collision according to the acceleration signal; actuating the air bag completely and concurrently when the vehicle collision is judged and the parallel bit signals coincide with the prescribed order of the serial signal. The method may include a step of actuating the air bag stepwise or concurrently after judging from the acceleration signal.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

First Embodiment

Figure 1:
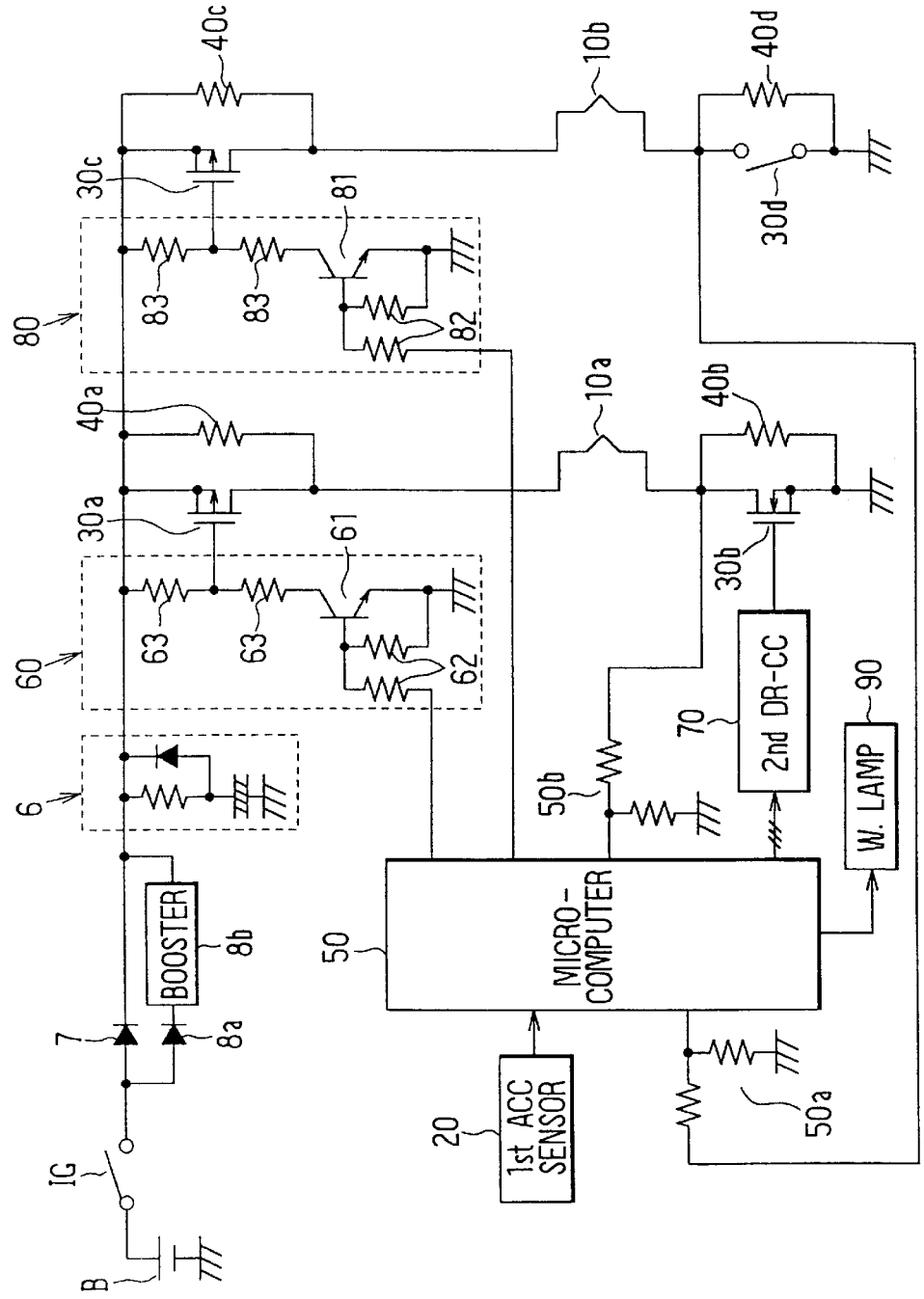
FIG. 1 is a circuit diagram of an actuator according to a first embodiment of the invention.

An actuator according to a first embodiment of the invention is described with reference to FIGS. 1–7.

The actuator is connected to vehicle battery B through ignition switch IG. The actuator has a power supply component including back-up circuit 6, diode 7, diode 8a, booster 8b, first squib 10a, second squib 10b, first acceleration sensor 20, first, second and third electronic switches 30a, 30b, 30c, fourth mechanical switch 30d, resistors 40a–40d, microcomputer 50, voltage dividing circuits 50a, 50b, first, second, third drive circuits 60, 70, 80 and warning lamp 90. Mechanical switch 30d is also referred to as second acceleration sensor.

First acceleration sensor 20 is an electronic sensor and a second acceleration sensor 30d is a normally-open-type mechanical switch. When second squib 10b is actuated, an air bag or a passenger protecting member of the driver's seat operates partially at the first stage. For convenience, the passenger protecting member is represented by an air bag hereafter. When first squib 10a is actuated subsequently, the air bag is fully inflated. First acceleration sensor 20 detects vehicle acceleration.

First and third electronic switches 30a, 30c are P-channel FETs and second electronic switch 30b is an N-channel FET. First and second switches 30a, 30b are turned on to actuate first squib 10a, and third and mechanical switches 30c, 30d are turned on when second squib 10b is actuated. Mechanical switch (or second acceleration switch) 30d closes when a vehicle acceleration becomes higher than a low acceleration level. The source terminal of first switch 30a is connected to backup circuit 6 and the drain terminal of first switch 30a is connected to the source terminal of second switch 30b through first squib 10a. The drain terminal of second switch 30b is grounded. If first and second switches 30a, 30b are turned on, drive current is supplied by backup circuit 6 to actuate first squib 10a. If either one of first and second switches 30a, 30b is not turned on, the drive current is not supplied to first squib 10a. The source terminal of third switch 30c is connected to backup circuit 6 and the drain terminal thereof is grounded through second squib 10b and mechanical switch 30d. If mechanical switch 30d is closed or turned on and third switch 30c is turned on, drive current is supplied by backup circuit 6 to actuate second squib 10b. If either one of third and mechanical switches 30c, 30d is not turned on, the drive current is not supplied to first squib 10a.

Resistors 40a–40d are provided for diagnosis circuit. Resistors 40a, 40b have respective resistances to prevent the drive current from actuating first squib 10a, and resistors 40c, 40d prevent the drive current from actuating second squib 10b.

Figure 4:
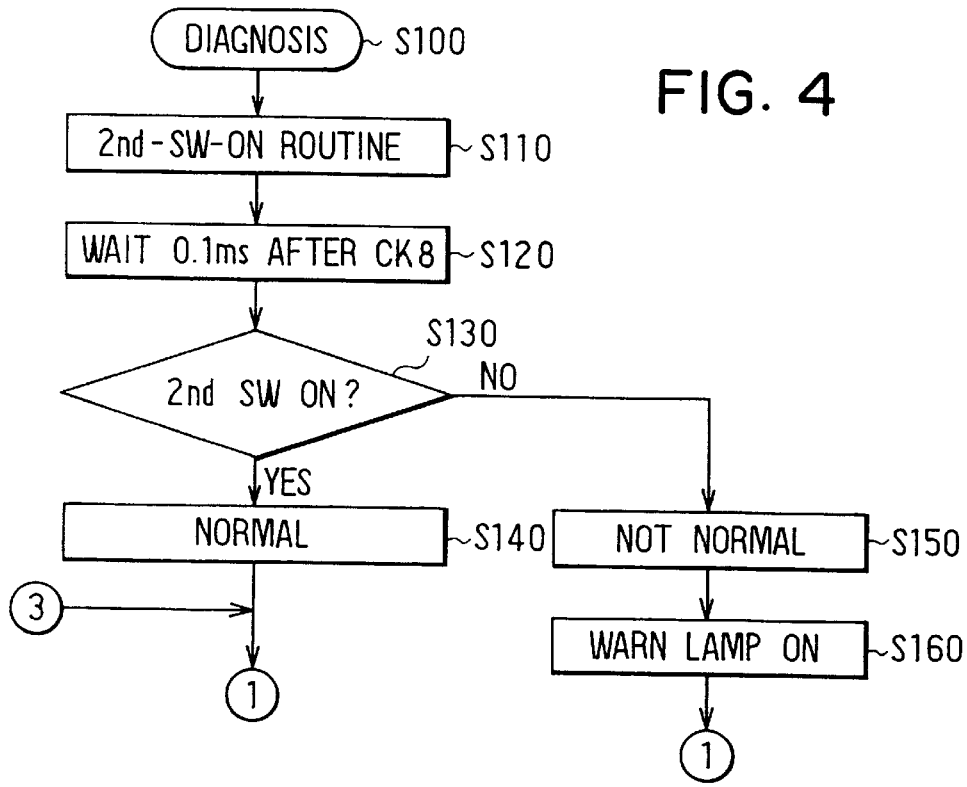
FIG. 4 is a first part of a flow diagram of operation of the microcomputer of the actuator according the first embodiment.
Figure 5:
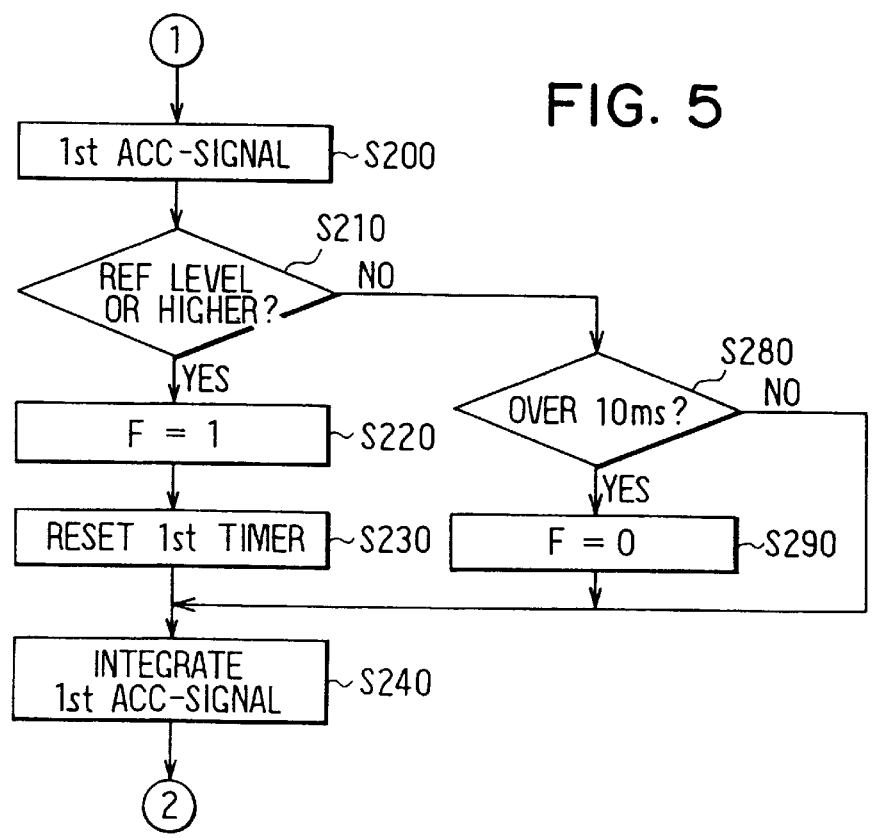
FIG. 5 is a second part of the flow diagram.
Figure 6:
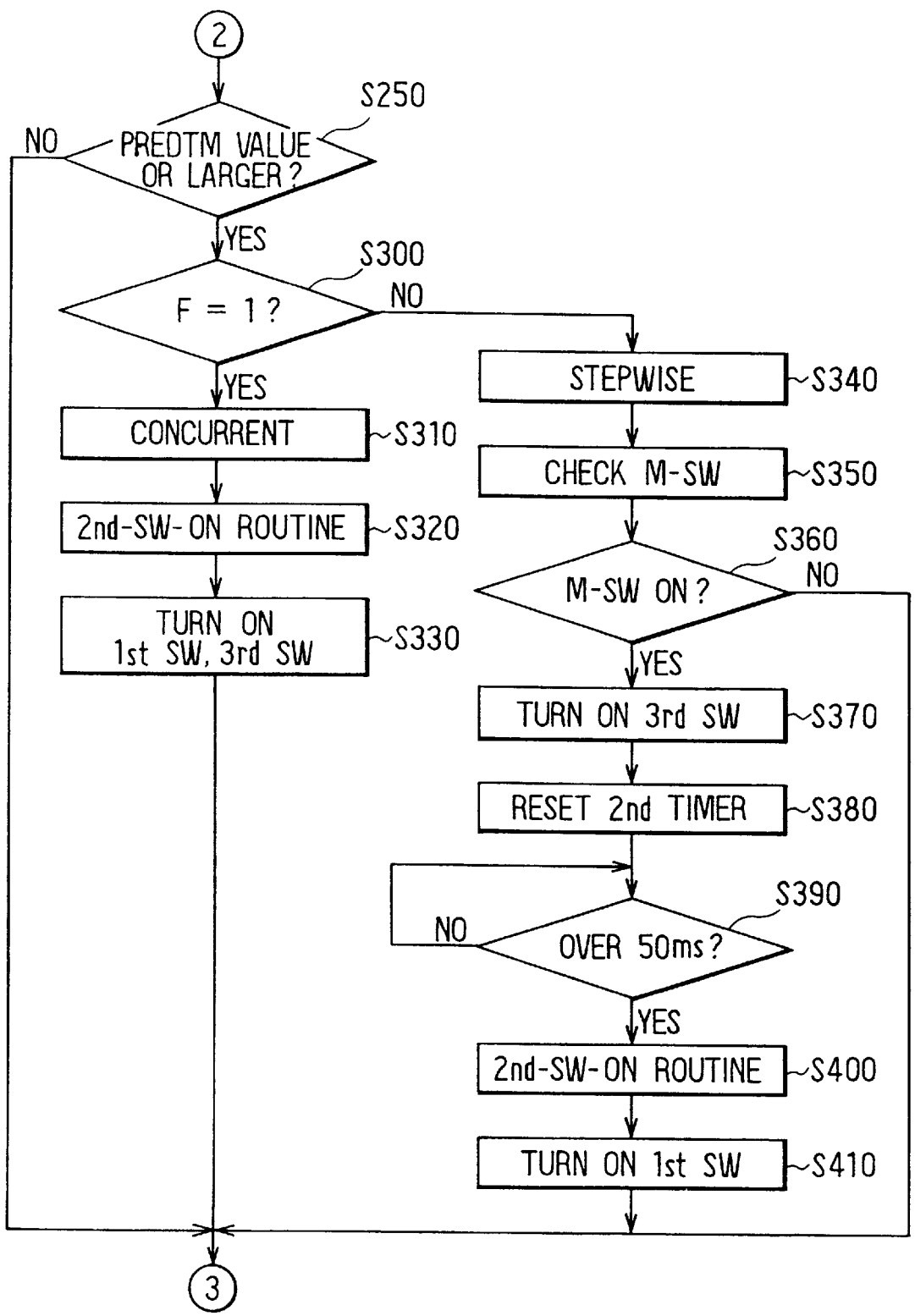
FIG. 6 is a third part of the flow diagram.

Microcomputer 50 executes programs as shown in FIGS. 4–6. Microcomputer 50 controls first, second and third drive circuits 60, 70 and 80 according to the output signals of first acceleration sensors 20, and mechanical switch 30d. Microcomputer 50 diagnoses the actuator itself by detecting voltage across second switch 30b through voltage dividing circuit 50b. Microcomputer 50 also detects voltage across mechanical switch 30d through voltage dividing circuit 50a.

In first drive circuit 60, transistor 61 is controlled (i.e., turned on or off) by microcomputer 50 via a pair of resistors 62. When transistor 61 turns on, voltage is supplied by backup circuit 6 through a pair of resistors 63 to the gate of first switch 30a to turn on the same. On the other hand, when transistor 61 turns off, first switch 30a turns off.

Transistor 81 of third drive circuit 80 is controlled to turn on or off by microcomputer 50 via a pair of resistors 82. When transistor 81 turns on, voltage is supplied by backup circuit 6 through a pair of resistors 83 to the gate of third switch 30c to turn on the same. On the other hand, when transistor 81 turns off, third switch 30c turns off.

Figure 2:
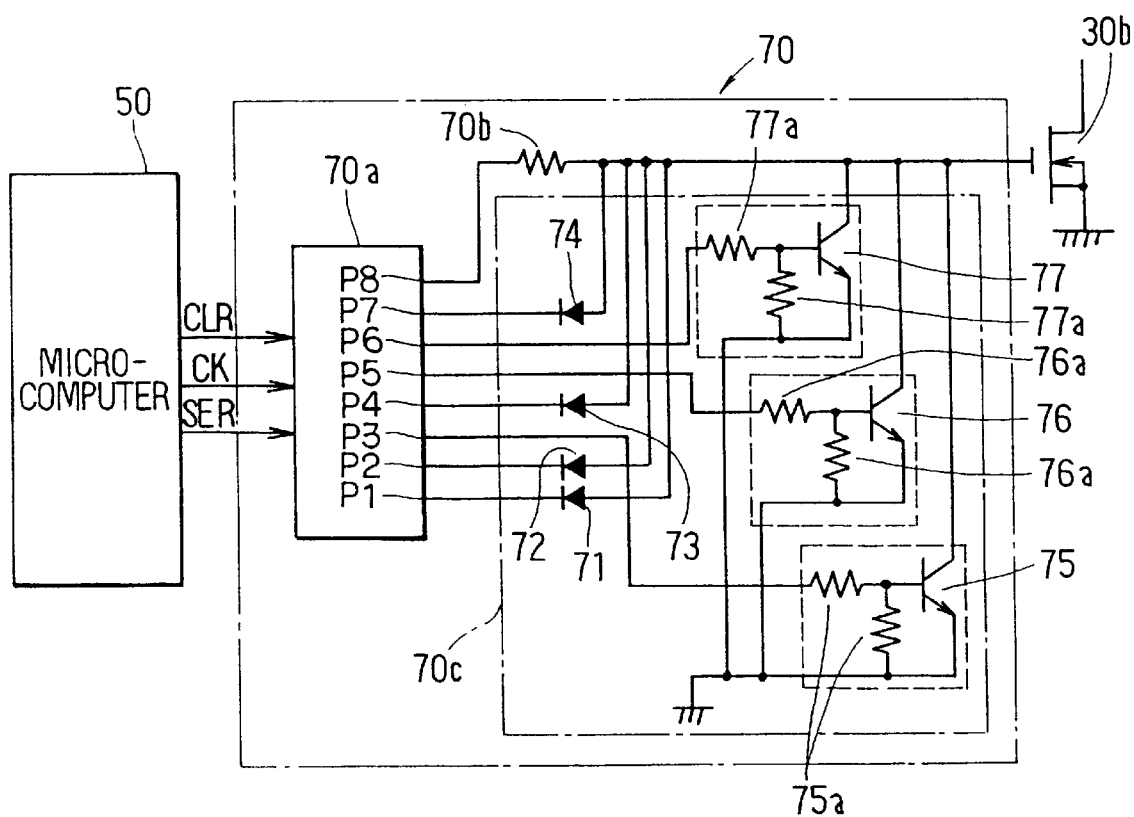
FIG. 2 is a circuit diagram of a drive circuit of the actuator according to the first embodiment.
Figure 3:
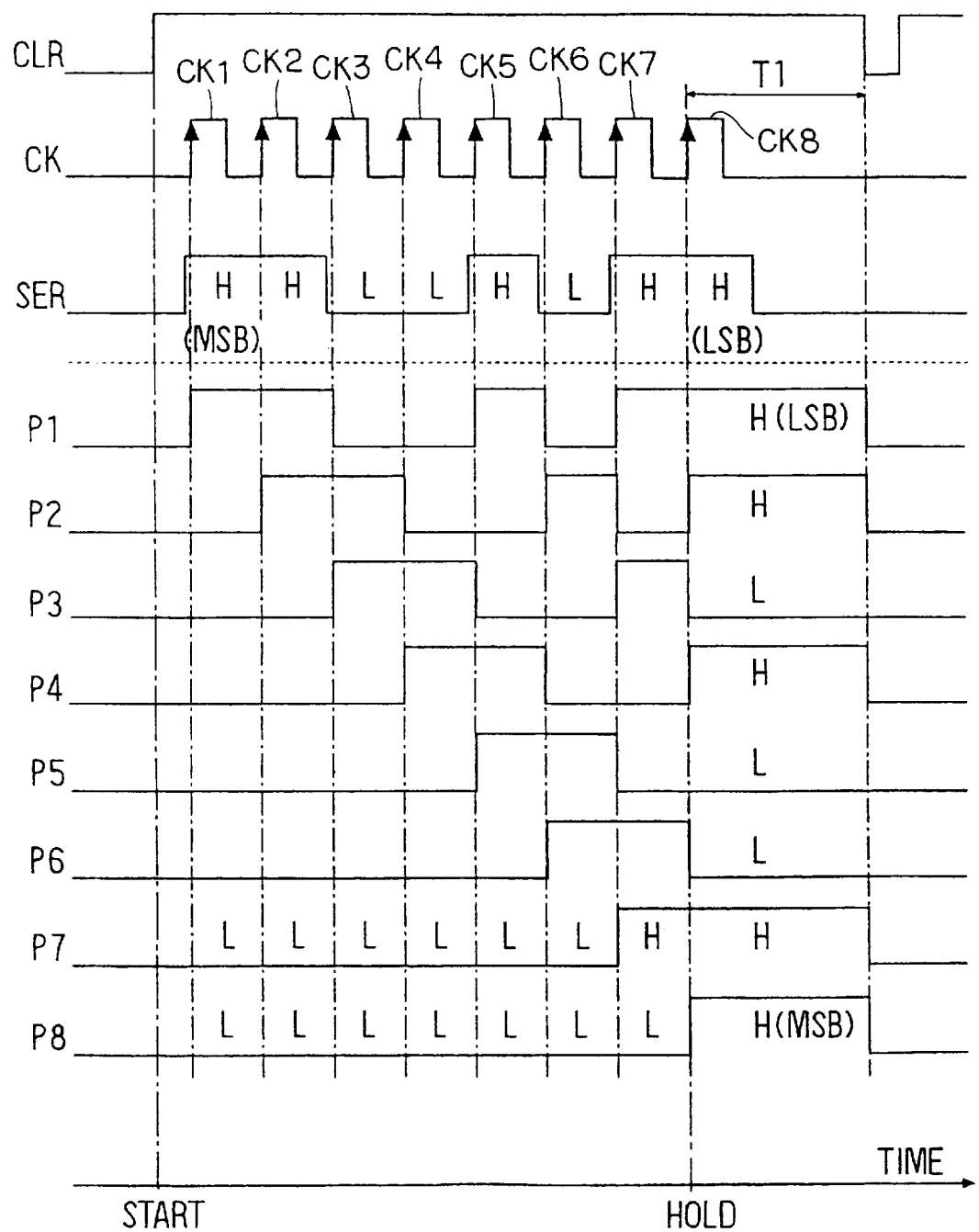
FIG. 3 is a timing chart of signals of a microcomputer and serial-parallel converter of the actuator according to the first embodiment.

As shown in FIG. 2, second drive circuit 70 includes circuit (hereinafter referred to as SPC circuit) 70a which converts serial signals to parallel signals. SPC circuit 70a is a shift register such as Toshiba-made # 74 HC 164. Microcomputer 50 provides a clear signal CLR, a clock signal CK, a serial signal SER as shown in FIG. 3. Serial signal SER is composed of 8-bit signals in a specific signal order or pattern for turning on second switch 30b, HHLLHLHH, as shown in FIG. 3. Second drive circuit 70 has protecting resistor 70b and prevention circuit 70c.

When the actuator is not operated, microcomputer 50 does not provides serial signal SER. SPC circuit 70a is controlled by clear signal CLR from microcomputer 50 to provide low level signal L on all eight output ports P1–P8 thereof.

When the actuator is operated, microcomputer 50 provides serial signal SER starting from MSB (most significant bit) ending in LSB (least significant bit) in synchronism with clock signal CK composed of eight signal bits CK1–CK8. SPC circuit 70a provides parallel signal PAR composed of eight signal bits corresponding to serial signal SER on the corresponding one of eight output ports P1–P8 as soon as microcomputer 50 provides LSB of signal SER.

When microcomputer 50 provides entire clock signal CK, SPC circuit 70a holds the parallel signal for hold time T1 (e.g. 50 milli-second), which corresponds to a time interval for holding second switch 30b from turning on. The cycle of clock signal CK is decided as follows. If first squib 10a is to be actuated 50 milli-second after second squib 10b is actuated, second switch 30b should be turned on within 50 milli-seconds after a vehicle collision is detected. In this case, the cycle of clock signal CK should be less than 5 milli-seconds because it takes 40 milli-seconds to provide 8 bit serial signal (i.e. 5 [millisecond/bit]×8 [bits]=40 [millisecond]).

Protecting resistor 70b is connected between output port P8 and the gate of second switch 30b. Thus, SPC circuit 70a supplies MSB of 8-bit-signal SER as the second-switch driving-signal from output port P8 to the gate of second switch 30b.

Prevention circuit 70c has four diodes 71–74 and three transistors 75–77. Four diodes 71–74 are connected to the gate of second switch 30b at the anodes thereof and to output ports P1, P2, P4, P7 of SPC circuit 70a respectively, at the cathode thereof. When output port P1 provides the low level signal, diode 71 prevents second switch 30b from turning on. When port P2 is low in the level, diode 72 prevents second switch 30b turning on. In the same manner, when output port P4 or P7 is low in the level, diode 73 or 74 prevents second switch 30b from turning on. Each of diodes 71–74 allows second switch 30b to turn on when it is not conductive.

Three transistors 75–77 are connected to second switch at the respective collectors thereof and to a ground at the respective emitters thereof. Transistor 75 is connected through one of a pair of resistors 75a to output port P3 of SPC circuit 70a at the base thereof. Transistor 76 is connected through one of a pair of resistor 76a to output port P5 at the base thereof, and transistor 77 is connected through one of a pair of resistor 77a to output port P6. When output port P3 is high in the level, transistor 75 is biased by the pair of resistors 75a to turn on, thereby preventing the turning-on of second switch 30b. When output port P5 or P6 is high in the level, transistor 76 or 77 prevents the turning-on of second switch 30b in the same manner. Each of transistors 75–77 allows second switch 30b to turn on when it does not turn on. It is noted that each one of diodes 71–74 and transistors 75–77 prevents or allows second switch 30b from turning on independently. Warning lamp 90 is operated by microcomputer 50.

When ignition switch IG is turned on, microcomputer 50 is energized by battery B to start executing the computer programs according to the flow diagrams shown in FIGS. 4–6. As shown in FIG. 4, diagnosis routine S100 starts.

In subroutine S110, a turn-on routine of second switch 30b is executed in the same manner. As shown in FIG. 3, microcomputer 50 provides clear signal CLR so that SPC circuit 70a provides output ports P1–P8 with low level voltage. When microcomputer 50 provides clock signal CK, SPC circuit 70a synchronously provides each of output ports P1–P8 with corresponding signal bit of serial signal SER. That is, output port P1 is provided with LSB of signal SER, and output port P8 is provided with MSB of signal SER. Consequently, diodes 71–74 become nonconductive since the signals of output ports P1, P2, P4, P7 are high, and transistors 75–77 become nonconductive since the signals of output ports P3, P5, P6 are low.

In S120, a certain time interval (e.g. 0.1 ms) is allowed to lapse to hold second switch 30b to turn on after the last pulse CK8 is provided. If second switch 30b and the circuits related to second switch are not in the normal condition, second switch 30b cannot be turned on during the holding time interval after output port P8 achieves a high level. If any one of the signals of output ports P1–P7 is different from the corresponding one of the serial signal pattern, second switch 30b is prevented from turning on by at least one of diodes 71–74 and transistor 75–77. Even if a noise signal is applied to any one of the output ports P1–P7, clear signal CLR and clock signal do not change so that SPC circuit 70a can be prevented from being affected. Thus, second switch 30b is surely prevented from turning on erroneously.

When the output terminal voltage of second switch 30b is applied to microcomputer 50 through voltage dividing circuit 50b, whether second switch 30b is turned on or not is determined according to the output terminal voltage in S130. If the output terminal voltage is low and the answer is YES, it is determined that second switch 30b and the related circuits are normal in step S140. On the other hand, if the output terminal voltage is high and the answer in S130 is NO, it is determined in S150 that second switch 30b and the related circuits including second drive circuit 70 are not normal. Subsequently, warning lamp 90 is lit in S160.

If second switch 30b and the related circuits are determined to be normal in S140, microcomputer 50 executes the program starting from S200 shown in flow diagrams in FIGS. 5 and 6. In S200, a signal of first acceleration sensor 20 is applied to microcomputer 50.

If an acceleration is higher than a reference level, YES is given in S210. This reference level represents a collision of a vehicle running at a high speed. Subsequently, collision flag F=1 is set in S220, a first timer of microcomputer 50 is reset to start in S230, the signal voltage of first acceleration sensor 20 is integrated as long as the first timer operates in S240, and the process proceeds to S250. If the acceleration is not higher than the reference level, NO is given in S210, and whether the first timer measures 10 milliseconds or not is determined in S280. If the result of the judge is NO, the process advances to S240. On the other hand, if the result is YES, flag F is set to 0 (F=0) and the first timer is reset in S290. Then, the process goes to the S250. Thus, flag F=1 is maintained for 10 millisecond even if the acceleration becomes lower than the reference level.

In S250, if the integration result is larger than a predetermined value, YES is given to proceed to S300. In S300, whether flag F is 1 or not is judged. If the result is YES, it is judged that both squibs 10a and 10b are to be actuated concurrently in S310. In S320, second switch 30b is turned on in the same manner as routine S110, and transistors 61, 81 of first and third drive circuits 60, 80 are controlled to turn on first and third switches 30a, 30c in S330. Since second switch 30b and mechanical switch 30d have been closed, first and second squibs 10a, 10b are supplied with drive current concurrently to fully inflate the air bag. The cycle time of clock signal CK can be less than 0.1 millisecond if the delay time of second switch 30b is less than 1 millisecond. Even if noise pulses are generated, it is practically impossible for the noises to coincide with the timing of clear pulse CLR, clock pulse CK or serial signal SER.

If flag F is not set to 1 in S300, the process goes to S340 to inflate the air bag stepwise, thereby moderating the shock of the air bag applied to the driver. Then, the terminal voltage of mechanical switch 30d is detected in S350 to determine whether mechanical switch 30d is closed or not in S360. If the determination is NO, third switch 30c is not turned on. On the other hand, if the determination is YES in S360, third switch 30c is turned on to actuate second squib 10b in S370, and the second timer is reset to start in S380. When the second timer measures counts 50 millisecond, YES is given in S390. In S400, second switch 30b is turned on in the same manner as in the timing diagram shown in FIG. 3, and first switch 30a is turned on in S410.

Thus, the air bag is fully inflated in two steps. Since the operation of the noise-proof mechanical switch 30d is confirmed before second switch 30b is turned on, first squib 10a can be actuated more surely. The time interval (50 millisecond) between the two stages is preferably between 45 milli-seconds and 55 milli-seconds.

Second switch can be turned on the turning-on of mechanical switch 30d is detected. Thus, it is not necessary to detect output signal of first acceleration sensor 20.

Second Embodiment

Figure 7:
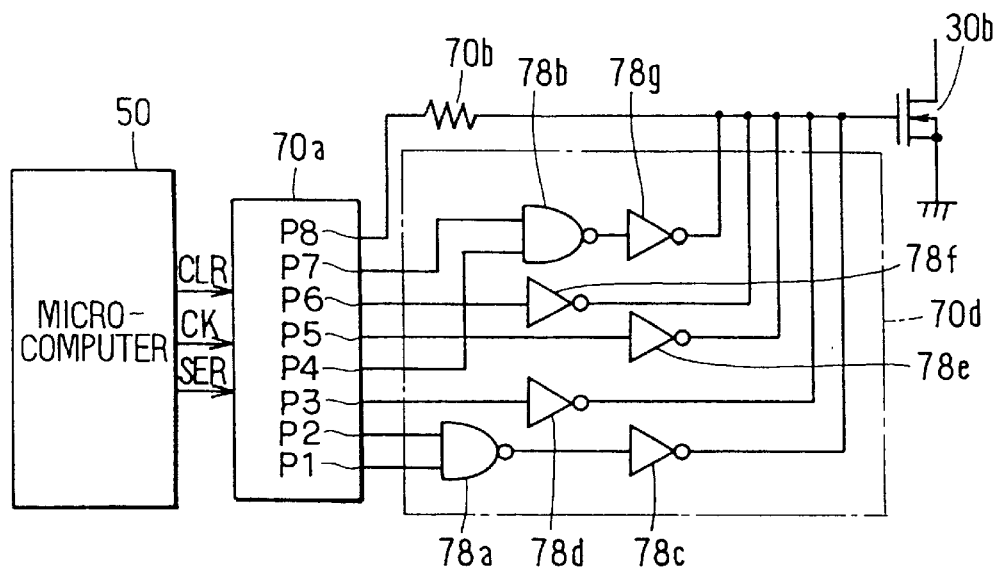
FIG. 7 is a circuit diagram of an actuator according to a second embodiment of the invention.

An actuator according to a second embodiment of the invention is described with reference to FIG. 7. The actuator according to the second embodiment has the same structure except for prevention circuit 70d. Prevention circuit 70d is composed of NAND gates 78a, 78b and a plurality of inverters 78c–78g. Each of NAND gates 78a, 78b and the plurality of inverters 78c–78g are open-drain type or open-collector type.

NAND gate 78a prevents the turning-on of second switch 30b (FIG. 1) through inverter 78c when one or both of output ports P1 and P2 provides or provide the low level signal. NAND gate 78 permits turning-on of second switch when both output ports P1 and P2 provide the high level signal. Inverter 78d prevents the turning-on of second switch 30b when output port P3 provides the high level signal. Inverter 78e prevents for turning-on of second switch 30b when output port P5 provides the high level signal. Inverter 78f prevents the turning-on of second switch 30b when output port P6 provides the high level signal. NAND gate 78b prevents the turning-on of second switch 30b through inverter 78g when one or both of output ports P3 and P4 provides or provide the low level signal. Thus, prevention circuit 70d operates in substantially the same manner as prevention circuit 70c of the actuator according to the first embodiment.

Third Embodiment

Figure 8:
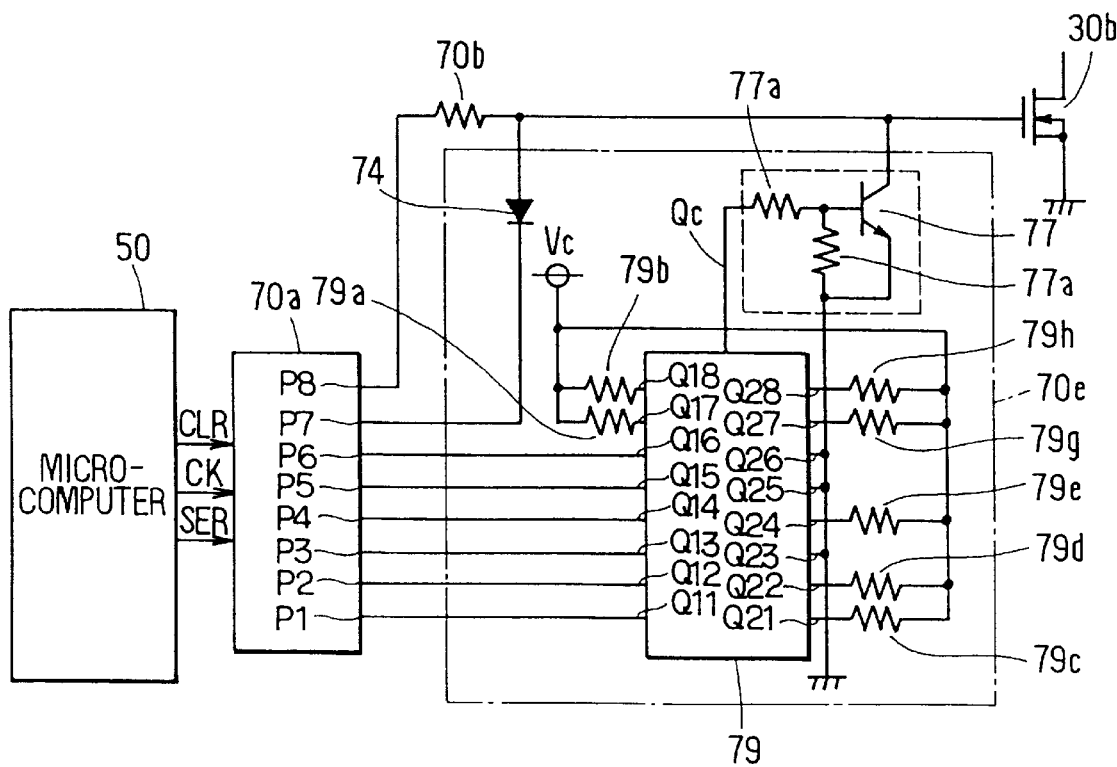
FIG. 8 is a circuit diagram of an actuator according to a third embodiment of the invention.

An actuator according to a third embodiment of the invention is described with reference to FIG. 8. The actuator according to the third embodiment has the same structure as the first embodiment except for prevention circuit 70e. Prevention circuit 70e is composed of 8-bit comparator 79, and resistors 79a–79f.

Comparator 79 (such as 74HC688 made by Toshiba Electric Company) has eight input terminals Q11–Q18 and eight output terminals Q21–Q28. Input terminals Q17, Q18 are connected to constant voltage source +Vc through respective resistors 79a, 79b to provide the high level signals thereon. Other input terminals Q11–Q16 are connected to respective output ports P1–P6 of SPC circuit 70a. Output terminals Q21, Q22, Q24, Q27, and Q28 are connected to constant voltage source through respective resistors 79c, 79d, 79e, 79g and 79h. Control terminal Qc of comparator 79 is connected to the base of transistor 77 through resistor 77a. Each signal level of output terminals Q21–Q26 is arranged so that control terminal Qc can provide the low level signal if (output port) P1 provides H (the high level signal), P2 provides H, P3 provides L (the low level signal), P4 provides H, P5 provides L, and P6 provides L. Thus, comparator 79 makes transistor 77 turn off via control terminal Qc to permit turning-on of second switch 30b. On the other hand, if any one of the signal level of input terminals Q11–Q18 is different from the signal level of a corresponding one of output terminals Q21–Q26, comparator 79 makes transistor 77 turn on to prevent the turning-on of second switch 30b. Thus, prevention circuit 70e operates in substantially the same manner as prevention circuit 70c of the actuator according to the first embodiment.

Fourth Embodiment

Figure 9:
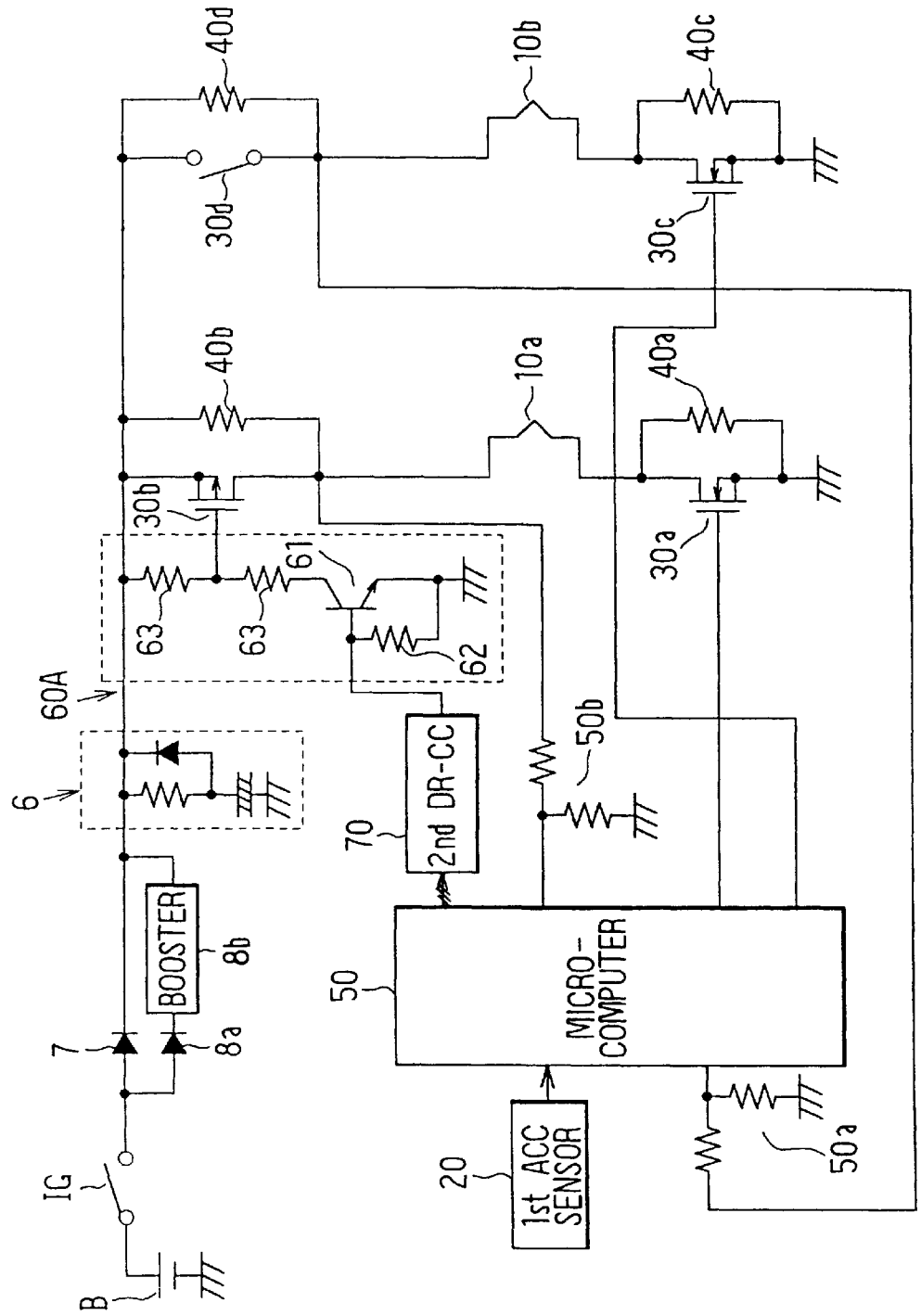
FIG. 9 is a circuit diagram of an actuator according to a fourth embodiment of the invention.

An actuator according to a fourth embodiment of the invention is described with reference to FIG. 9.

First squib 10a is grounded through first switch 30a when first switch turns on in this embodiment. First switch 30a is directly controlled by microcomputer 50, and second switch 30b is controlled by microcomputer 50 via first drive circuit 60A and second drive circuit 70. First drive circuit 60A is substantially the same in structure as first drive circuit 60. Second squib 10b is grounded through third switch 30c when the same turns on. Third switch 30c is also controlled by microcomputer 50 directly. Other portions are substantially the same as the first embodiment.

Thus, the actuator according to the fourth embodiment operates in substantially the same manner as the actuator according to the first embodiment.

Fifth Embodiment

Figure 10:
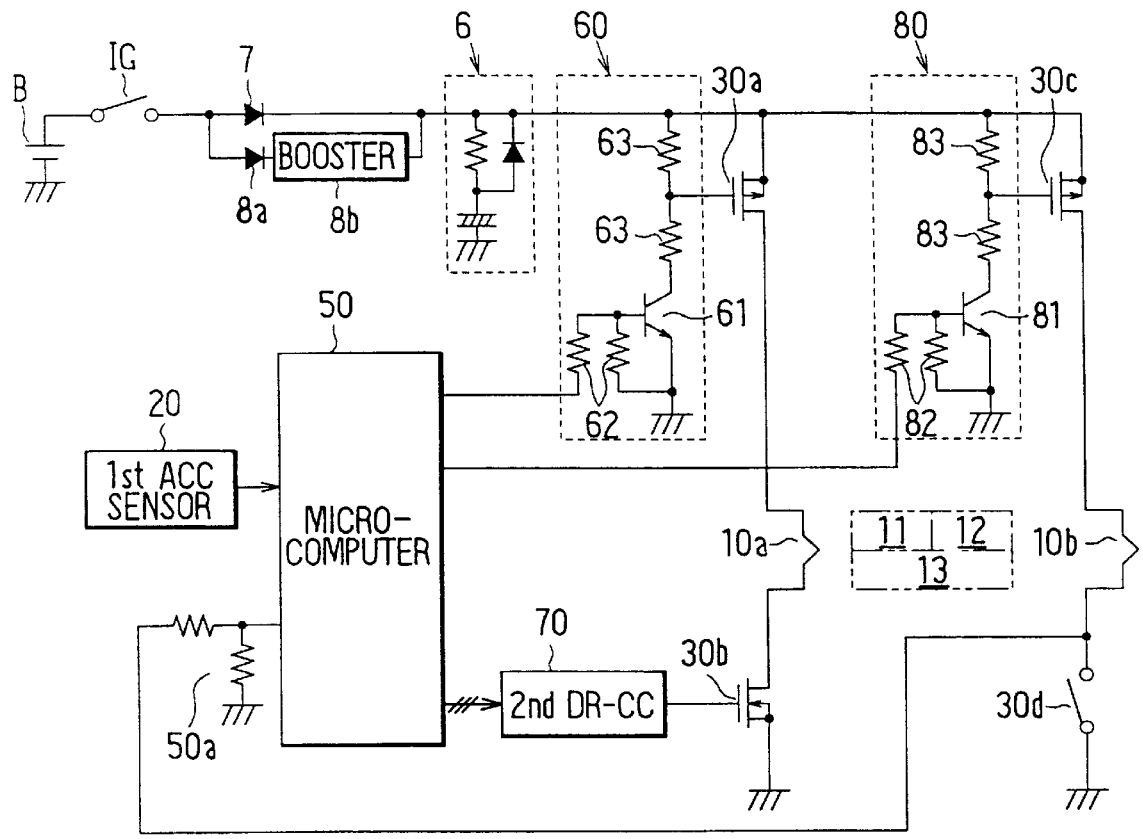
FIG. 10 is a circuit diagram of an actuator according to a fifth embodiment of the invention.

An actuator according to a fifth embodiment of the invention is described with reference to FIG. 10. The actuator has almost the same structure as the first embodiment except for resistors 40a–40d for the diagnosis and warning lamp 90. The actuator is used for a discrete passenger protecting system mounted in the front passenger's seat having air bag 13 and two inflators 11, 12. Air bag 13 can be inflated by inflator 12 partly or both of inflators 11, 12 completely. Inflator 11 is ignited by squib 11 and generate pressure gas to inflate air bag 13. Inflator 12 is ignited by squib 10b and generates pressure gas at a moderate pressure.

When the vehicle engine is started, microcomputer 50 is energized and comes into operation in the steps shown in FIGS. 5 and 6. If a vehicle happens to collide severely and both squibs 10a, 10b are actuated concurrently, both inflators 11, 12 inflate air bag 13 to protect a passenger in the front passenger's seat. On the other hand, if the vehicle is given a shock that is not so sever but high to close mechanical switch 30d, third switch 30c is turned on to actuate second squib 10b to ignite inflator 12. Subsequently, second switch 30b is turned on, and first switch 30a is turned on to actuate first squib 10a, thereby igniting inflator 11 as described with reference to the flow diagram shown in FIG. 6. Thus, the air bag 13 is fully inflated in two stages. When air bag 13 is inflated by inflator 12 at a moderate pressure and, subsequently, by inflator 11 at an additional pressure that is lower than the moderate pressure, a passenger is not injured by air bag 13.

Sixth Embodiment

Figure 11:
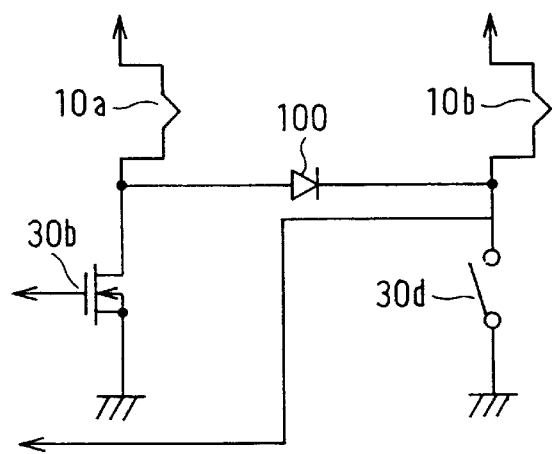
FIG. 11 is a portion of a circuit diagram of an actuator according to a sixth embodiment of the invention.

An actuator according to a sixth embodiment of the invention is described with reference to FIG. 11. Diode 100 is connected between second switch 30b and mechanical switch 30d to decrease the response time of second switch 10b. The anode of diode 100 is connected to the drain of second switch 30b and the cathode thereof is connected to the high-side terminal of mechanical switch 10d. When first switch 30a and mechanical switch 30d are turned on, current is supplied to first squib 10a immediately through diode 100 and mechanical switch 30d irrespective of the time lag caused by clock pulse CK.

Seventh Embodiment

Figure 12:
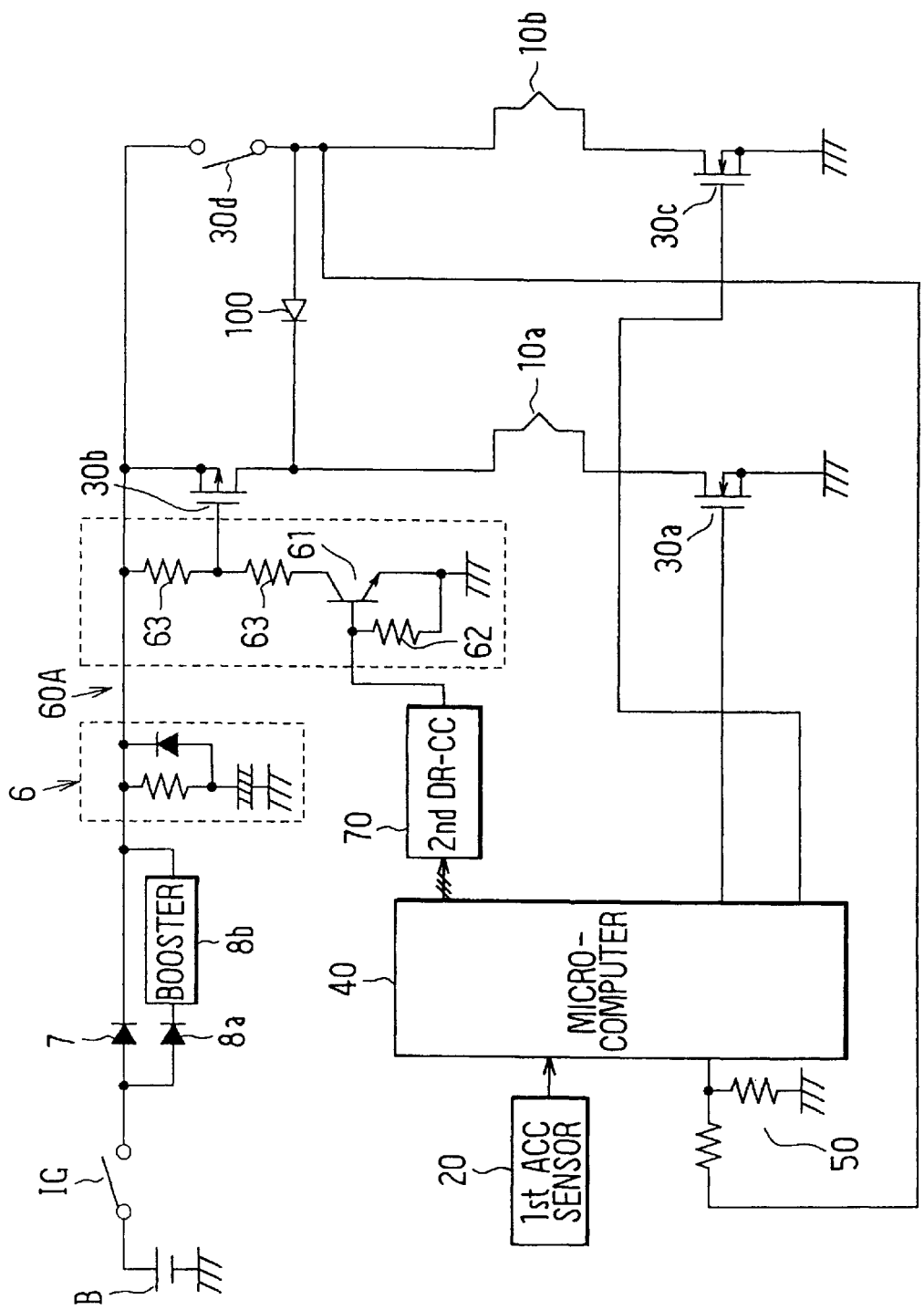
FIG. 12 is a circuit diagram of an actuator according to a seventh embodiment of the invention.

An actuator according to a seventh embodiment of the invention is described with reference to FIG. 12. The actuator has almost the same structure as the fourth embodiment except for resistors 40a–40d for the diagnosis and additional diode 100. The cathode of diode 100 is connected to the source of second switch 30b and the anode thereof is connected to the low-side terminal of mechanical switch 30d to shorten the response time of first squib 10a in the same manner as the sixth embodiment.

Variations

Mechanical switch 30d of the above embodiments may be substituted by an electronic switch or FET connected in parallel with resistor 40d. In this case, it is necessary to provide another mechanical switch for the second acceleration sensor that is separate from the electric switch and connected to microcomputer 50 in substantially the same manner as shown in FIG. 1.

In the third embodiment, input terminal Q17 of comparator circuit 79 and output port P7 of SPC circuit 70a may be connected directly without diode 74 and resistor 79a, and terminal Q18 of comparator 79 and output port Q8 of SPC circuit 70a can be connected directly without resistors 70b, 79b. In this case, microcomputer 50 is connected to resistor 70b through another output port. Thus, all output ports P1–P8 are used to prevent the turning-on of second switch 30b, and the signal to allow turning-on of the same is supplied by microcomputer 50 through a separate circuit. If the transmission speed of serial signal SER is set by SPC circuit 70a, clock signal CK can be omitted. Both first and second mechanical acceleration sensors 20, 30d may be substituted by electronic acceleration sensors. For example, a side collision protecting apparatus can have acceleration sensors respectively on right and left seats and a separate control unit for actuating the actuator when the side collision is judged. In a protecting apparatus having both driver's air bag and front passenger's air bag, it is possible to inflate the driver's air bag about 50 ms after the belt pre-tensioner operates if a driver does not fasten the seat belt while a passenger does.

First, second and third switches 30a, 30b, 30c may be semiconductor switch elements other than FETs. Microcomputer 50 and the operational steps shown in FIGS. 4–6 can be substituted by discrete circuits.

Instead of step S210, belt tension may be detected to determine whether to actuate the squibs. The squibs should be actuated concurrently if a passenger fastens the seat belt. Otherwise, the squibs should be actuated stepwise. Diode 100 may be substituted by a thyristor or the like.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An actuator for a vehicular passenger protecting member including a power source, comprising:
    an acceleration sensor for providing an acceleration signal;
    a determination mechanism configured to provide a vehicle collision signal when said acceleration signal is greater than a predetermined level;
    a propulsion mechanism configured to actuate said passenger protecting member when energized;
    an electronic switch unit connected in series to said power source and said propulsion means;
    a drive circuit for driving said electronic switch unit to connect said power source and said propulsion mechanism when said determination mechanism provides said vehicle collision signal; and
    a serial signal generator for generating a serial signal composed of a prescribed number of serial bit signals in a prescribed order at least when said determination mechanism provides said collision signal;
    wherein said drive circuit comprises:
    a converter for converting said serial signal to a parallel signal composed of the same number of parallel bit signals as said prescribed number of serial bit signals after said serial signal generator provides said serial signal; and
    a prevention mechanism configured to prevent said electronic switch unit from connecting said power source and said propulsion mechanism when said parallel bit signals do not coincide with a prescribed signal pattern corresponding to said prescribed order.

2. The actuator as claimed in claim 1, further comprising a diagnosis circuit for determining abnormalities based on a voltage across said electronic switch unit and a warning device operable when said abnormalities are determined.

3. The actuator as claimed in claim 1, wherein
    said prevention mechanism comprises a plurality of circuits connected between said serial parallel converter and said electronic switch unit, and
    each of said plurality of circuits prevents the turning-on of said electronic switch unit when a signal applied thereto does not coincide with corresponding one of said parallel bit signals.

4. The actuator as claimed in claim 1, wherein
    said propulsion mechanism comprises a first propulsion element and a second propulsion element,
    said electronic switch unit comprises a first series circuit having a pair of first and second electronic switches and said first propulsion element connected in series, and a second series circuit having a pair of third electronic and mechanical switches and said second propulsion element connected in series, said mechanical switch closing when said vehicle is given a prescribed degree of shock,
    said determination mechanism determines whether to actuate said second and first propulsion elements stepwise or concurrently according to said acceleration signal, and
    said drive circuit comprises a first drive circuit for turning on said first electronic switch, a second drive circuit for turning on said second electronic switch, and a third drive circuit for turning on said third electronic switch, respectively, according to the determination of said determination mechanism.

5. The actuator as claimed in claim 4, wherein
    said first electronic switch is connected between said power source and said first propulsion element, and
    said third electronic switch is connected between said power source and said second propulsion element.

6. The actuator as claimed in claim 5 further comprising a one-way conductor element for connecting said first propulsion element and said mechanical switch in series to actuate said first propulsion element when said mechanical switch is closed.

7. The actuator as claimed in claim 6, wherein said one-way conductor element comprises a diode having anode connected to said mechanical switch and a cathode connected to said first propulsion element.

8. The actuator as claimed in claim 4, wherein
    said second electronic switch is connected between said power source and said first propulsion element, and
    said mechanical switch is connected between said power source and said second propulsion element.

9. The actuator as claimed in claim 8 further comprising a one-way conductor element for connecting said first propulsion element and said mechanical switch in series to actuate said first propulsion element when said mechanical switch is closed.

10. The actuator as claimed in claim 9, wherein said one-way conductor element comprises a diode having a cathode connected to said mechanical switch and an anode connected to said first propulsion element.

11. The actuator as claimed in claim 4, wherein
said passenger protecting member comprises an air bag, a first inflator ignited by said first propulsion element, and a second inflator ignited by said second propulsion element; and
said second inflator inflates said air bag initially and said first inflator inflates said air bag additionally and completely.

12. The actuator as claimed in claim 11, wherein
said first electronic switch is connected between said power source and said first propulsion element, and
said third electronic switch is connected between said power source and said second propulsion element.

13. The actuator as claimed in claim 11 further comprising a one-way conductor element for connecting said first propulsion element and said mechanical switch in series to actuate said first propulsion element when said mechanical switch is closed.

14. The actuator as claimed in claim 13, wherein said one-way conductor element comprises a diode having anode connected to said mechanical switch and a cathode connected to said first propulsion element.

15. The actuator as claimed in claim 11, wherein
said second electronic switch is connected between said power source and said first propulsion element, and
said mechanical switch is connected between said power source and said second propulsion element.

16. The actuator as claimed in claim 15 further comprising a one-way conductor element for connecting said first propulsion element and said mechanical switch in series to actuate said first propulsion element when said mechanical switch is closed.

17. The actuator as claimed in claim 16, wherein said one-way conductor element comprises a diode having a cathode connected to said mechanical switch and an anode connected to said first propulsion element.

18. A method of operating a passenger protecting member for a vehicle comprising:
detecting an acceleration level of said vehicle;
providing a serial signal composed of a prescribed number of serial bit signals in a prescribed order when said acceleration level is higher than a first prescribed level;
converting said serial signal to a parallel signal composed of the same number of parallel bit signals as said prescribed number of serial bit signals after said serial signal is provided;
mechanically actuating said passenger protecting member partially when said acceleration level is greater than a second prescribed level; and
actuating said passenger protecting member completely and concurrently after the same is actuated partially when said parallel bit signals coincide with a parallel bit pattern corresponding to said prescribed order.

19. The method as claimed in claim 18, further including,
determining whether to actuate said passenger protecting member stepwise or concurrently based on an acceleration of the vehicle,
wherein said actuating comprises actuating said passenger protecting member stepwise or concurrently according to said determining.

20. An actuator for a passenger protecting member for a vehicle including a power source comprising:
a propulsion mechanism configured to actuate said passenger protecting member when energized by said power source, said propulsion mechanism comprising a first propulsion element and a second propulsion element;
a first switch unit comprising a series circuit of a pair of first and second electronic switches and said first propulsion element;
a second switch unit comprising a series circuit of a pair of a third electronic switch and a mechanical switch and said second propulsion element, said mechanical switch closing when vehicle is given a prescribed degree of shock;
an acceleration sensor for providing an acceleration signal;
a collision detector mechanism configured to provide a collision signal according to said acceleration signal;
an operation determining mechanism configured to determine whether to actuate said first and second propulsion elements stepwise or concurrently according to said acceleration signal;
a first drive circuit for concurrently turning on said first and second switch units when said collision detection mechanism provides said collision signal and said operation determining mechanism determines to concurrently actuate said first and second propulsion elements;
a second drive circuit for stepwise turning on said first and second switch units when said collision detection mechanism provides said collision signal and said operation determination mechanism determines to stepwise actuate said first and second propulsion elements;
a conductor element connected between said first propulsion element and said mechanical switch to actuate said first propulsion element when said mechanical switch is closed.

21. The actuator as claimed in claim 20, wherein
said second electronic switch is connected between said power source and said first propulsion element, and
said mechanical switch is connected between said power source and said second propulsion element.

22. The actuator as claimed in claim 20, wherein said conductor element comprises a one-way conductor element.

23. The actuator as claimed in claim 22, wherein
said second electronic switch is connected between said power source and said first propulsion element, and
said mechanical switch is connected between said power source and said second propulsion element.

24. The actuator as claimed in claim 22, wherein said one-way conductor element comprises a diode having an anode connected to said mechanical switch and a cathode connected to said first propulsion element.

25. The actuator as claimed in claim 22, wherein
said second electronic switch is connected between said power source and said first propulsion element, and
said mechanical switch is connected between said power source and said second propulsion element.

* * * * *